United States Patent [19]
Ennis

[11] Patent Number: 5,447,591
[45] Date of Patent: Sep. 5, 1995

[54] TRAP PRINTING METHOD FOR BONE-IN MEAT CONTAINERS

[75] Inventor: Gary D. Ennis, Wichita Falls, Tex.

[73] Assignee: W. R. Grace & Co.-Conn., Duncan, S.C.

[21] Appl. No.: 102,171

[22] Filed: Aug. 4, 1993

[51] Int. Cl.6 .................................. B32B 31/00
[52] U.S. Cl. .......................... 156/229; 156/297; 156/302; 156/277
[58] Field of Search .............. 156/277, 272.6, 302, 156/297, 229

[56] References Cited

U.S. PATENT DOCUMENTS

| | | | |
|---|---|---|---|
| 4,442,158 | 4/1984 | Distler | 428/195 |
| 4,475,241 | 10/1984 | Mueller et al. | 383/113 |
| 4,619,361 | 10/1986 | Thomas, Jr. | 206/204 |
| 4,755,403 | 7/1988 | Ferguson . | |
| 4,795,665 | 1/1989 | Lancaster et al. | 428/34 |
| 4,995,927 | 2/1991 | Garrett | 156/152 |
| 5,078,817 | 1/1992 | Takagaki et al. | 156/73 |
| 5,128,182 | 7/1992 | Bunker et al. | 428/34 |
| 5,190,609 | 3/1993 | Lin et al. | 156/247 |
| 5,302,402 | 4/1994 | Dudenhoeffer . | |

*Primary Examiner*—Chester T. Barry
*Attorney, Agent, or Firm*—Mark B. Quatt

[57] ABSTRACT

Disclosed is an oriented, heat shrinkable, thermoplastic vacuum bag having a protective heat shrinkable reverse printed patch attached thereto, thereby protecting the bag from puncture by sharp protruding bones in bone-in cuts of meat which are vacuum packaged within the bags while simultaneously providing desired graphics protected from abrasion. The protection is especially directed to prevention destruction of the desired graphics when used on bags for packaging bone-in cuts of both fresh and smoked or processed meat. The reverse trap printed bag produced by this method is also disclosed.

15 Claims, 3 Drawing Sheets

TRAP PRINTING METHOD FOR BONE-IN MEAT CONTAINERS

BACKGROUND OF THE INVENTION

1. Field of the Invention

This invention relates to a reverse trap printed, heat shrinkable, oriented thermoplastic film. The invention particularly relates to a reverse trap printed, heat shrinkable, oriented thermoplastic film roll stock, heat shrinkable containers make therefrom and methods for producing said film roll stock and said containers.

2. Description of the Related Art

Transparent or translucent plastic containers are often used in the packaging of fresh meats and poultry. This type of transparent or translucent plastic container having a "bone patch" is also commonly used for bone-in primal cuts of meat and for large carcass poultry such as turkey. In addition to protecting the packaged meat product the plastic container commonly has printed matter visible on the outside of the package. Commonly, the printing is done on the outside surface of the plastic container. In order to offer some protection to the printed matter from abrasive damage a coat of varnish or other protective layer may be applied over the printing. After known method is to print on the container outer surface before applying the patch and then providing a layer of adhesive over the printing and adhering the patch to this layer of adhesive. The adhesive may be applied directly over the printing or, preferably, is applied to one surface of the patch material before attachment to the food container over the printing. An improved method of protecting the printing is the use of reverse printing on a second layer of film which is then bonded to the first, product containing, film layer. An example of this type of reverse printed container is disclosed in U.S. Pat. No. 5,190,609 issued Mar. 2, 1993 to Lin et al. This reference teaches the use of a heat shrinkable label formed of polyolefin such as polypropylene having a layer of adhesive, a layer of printing and a second layer of adhesive, with or without a second layer of polyolefin film to form a label for adhesive attachment to the outside of a container. This teaching requires an adhesive layer between the printing and the layer of film covering the printing. This reference also discloses the use of a varnish over the printing when the printing is applied to the outer surface of the polyolefin film in a traditional, non-reverse, printing method. A trap printed package for snack foods comprising an outer layer of polypropylene having reverse printing thereon is coated on the printed side with a primer coating which provides bonding adhesion for the PVDC barrier layer attached thereto is disclosed in U.S. Pat. No. 4,442,158 issued Apr. 10, 1984 to Distler. An inner surface layer of ionomer resin to prevent Cl migration to the contained food product is also required.

OBJECTS AND SUMMARY OF THE INVENTION

It is one object of the present invention to provide a heat shrinkable bag having a heat shrinkable patch material located such that it will minimize the puncturing of flexible, heat shrinkable vacuum bags by sharp bones and provide a trapped printed area on the bags.

Another object of the present invention is to provide a heat shrinkable bone patch for a thermoplastic vacuum bag which is relatively strong and tough and which can be readily adhered to the outer surface of a thermoplastic vacuum bag without distorting or making illegible the graphics printed thereon.

A further object of the present invention is to provide a heat shrinkable bone patch container for a thermoplastic vacuum bag which does not require special production or processing steps to realize the reverse printing and trapping of desired graphics.

Accordingly, one form of the present invention relates to a method of making a heat shrinkable bag having a protective heat shrinkable reverse printed bone guard patch attached thereto comprising: providing an oriented, heat shrinkable, thermoplastic sheet of bone guard patch film; reverse printing at least one desired graphic on one surface of said bone guard patch film; applying an adhesive composition over the reverse printed surface of said bone guard patch film and over the reverse printing; adhesively bonding the reverse printed and adhesive layered bone guard patch film onto an oriented, heat shrinkable, thermoplastic tubing in a desired position; and forming a bag from the heat shrinkable bone guard patch adhering thermoplastic tubing; thereby producing an oriented, heat shrinkable, thermoplastic bag having a heat shrinkable bone guard patch in a desired position thereon.

Another form of the present invention relates to a method of making a heat shrinkable bag having a protective heat shrinkable reverse printed bone guard patch attached thereto comprising: providing an oriented, heat shrinkable, thermoplastic sheet of bone guard patch film; reverse printing at least one desired graphic on one surface of said bone guard patch film; applying an adhesive composition over the reverse printed surface of said bone guard patch film and over the reverse printing; forming a bag from an oriented, heat shrinkable, thermoplastic tubing; adhesively bonding the reverse printed and adhesive layered bone guard patch film onto the oriented, heat shrinkable, thermoplastic bag in a desired position; and thereby producing an oriented, heat shrinkable, thermoplastic bag having a heat shrinkable bone guard patch in a desired position thereon.

Preferred forms of the invention, as well as other embodiments, objects, features and advantages of this invention, will be apparent from the following detailed description which is to be read in connection with the accompanying drawings.

BRIEF DESCRIPTION OF THE DRAWINGS

In the drawings which are appended hereto and make a part of this disclosure.

DESCRIPTION OF THE PREFERRED EMBODIMENTS OF THE INVENTION

Figure 1:
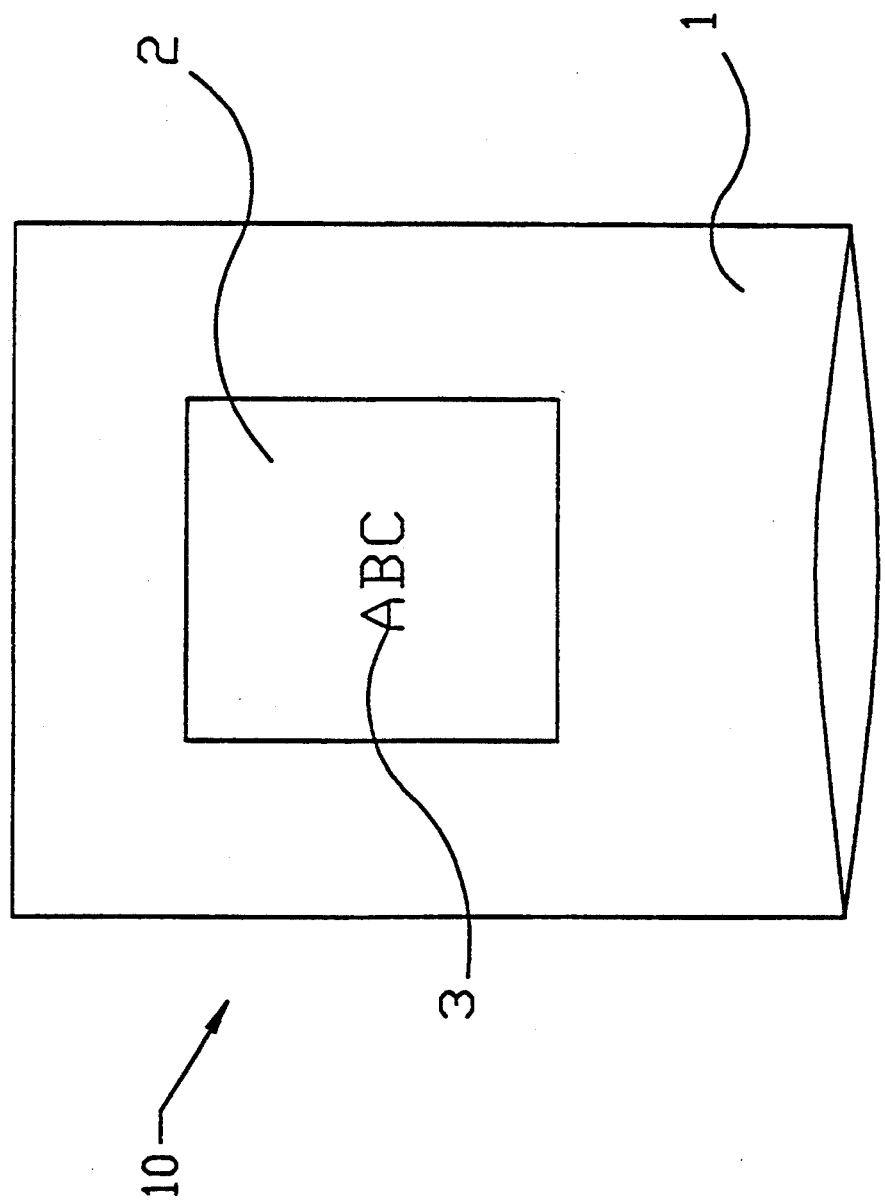
FIG. 1 is a plan view of a thermoplastic heat shrinkable container having a reverse printed bone patch attached to the surface thereof.

Many cuts of meat have bones that are on the side of the product and/or at the ends of the product. Examples of side bone products include, for example, short loin, spareribs, short ribs and picnics. Picnics and hams are examples of end bone products. The present invention provides a bone guard patch container having good protection against bag rupture and providing improved reverse trap printing thereon.

The present invention will be better understood from the specification taken in conjunction with the accompanying drawings in which like reference numerals refer to like parts.

Referring now to FIG. 1, there is shown a bone patch containing thermoplastic container 10 comprising a heat shrinkable thermoplastic bag 1 having a heat shrinkable thermoplastic bone guard patch 2 bonded thereto, said heat shrinkable thermoplastic bone guard patch having a graphic 3 reverse printed thereon.

Figure 2:
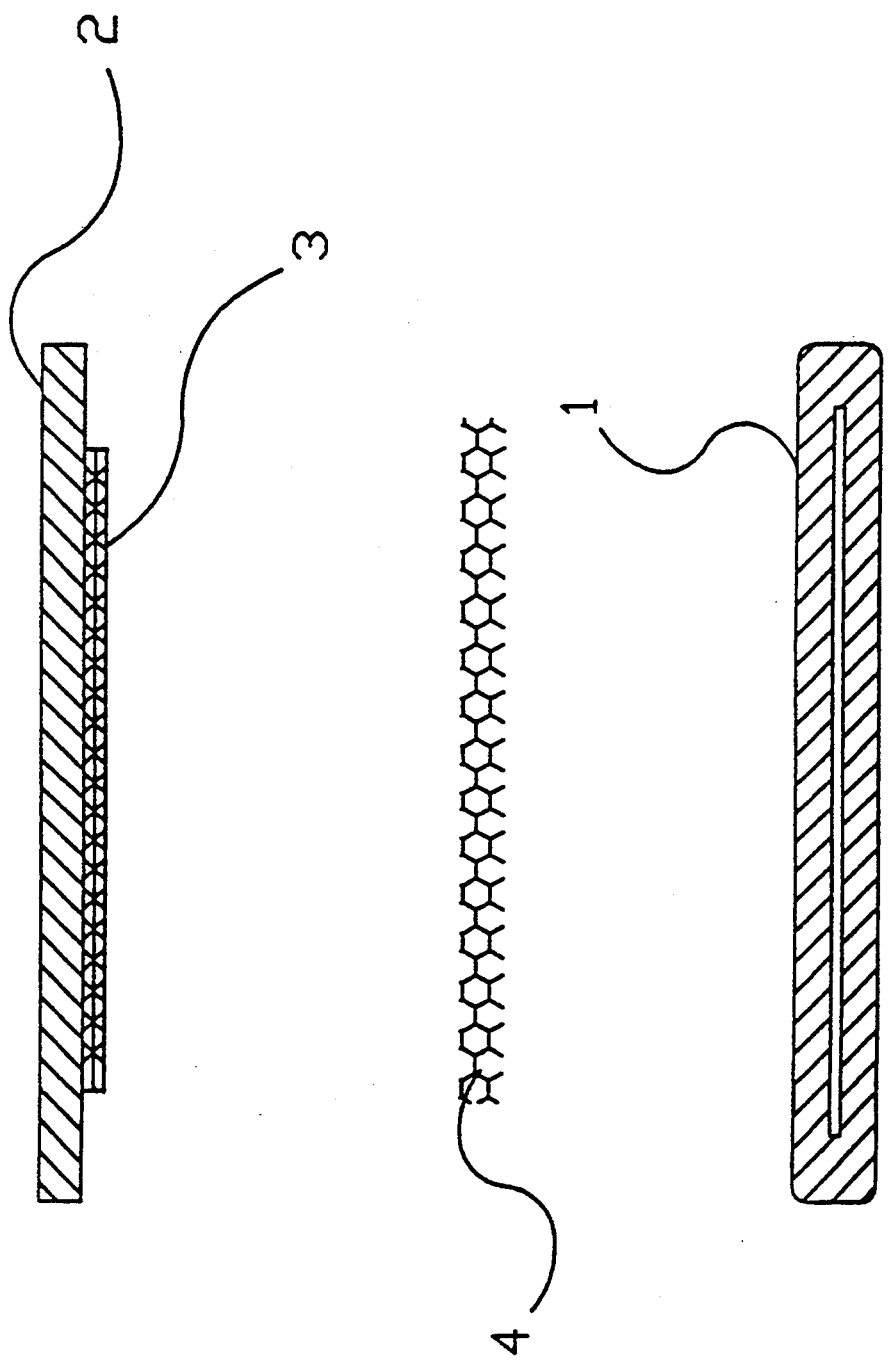
FIG. 2 is a schematic side view blow-up of a thermoplastic heat shrinkable bone patch container of the present invention.

In FIG. 2 is shown a cross sectional view of the container of the present invention comprising a heat shrinkable thermoplastic bag 1, a heat shrinkable thermoplastic bone guard patch 2 with a reverse printed graphic 3 printed thereon and a layer of adhesive 4 which is preferably applied to the heat shrinkable thermoplastic bone guard patch 2 over the reverse printed graphic 3 before the heat shrinkable thermoplastic bone guard patch 2 is applied to the heat shrinkable thermoplastic bag 1.

A preferred heat shrinkable thermoplastic bone guard patch material comprises four layers. The two outer layers are composed of 87% by weight of linear low density polyethylene, 10% by weight of ethylene-vinyl acetate copolymer having 9% vinyl acetate, and 3% pigments and other additives to aid in extrusion. The preferred linear low density polyethylene is Dowlex 2045 from Dow Chemical Company of Midland, Mich. and the preferred ethylenevinyl acetate copolymer is ELVAX 3128 from the DuPont Company of Wilmington, Del. The inner two layers comprise ethylene-vinyl acetate copolymer ELVAX 3128. All layers have been cross-linked by irradiation to dosage level which is equivalent to 7 MR.

The embodiment as described above is a preferred one but a suitable heat shrinkable patch for use in the present invention can be made where the two outer layers comprise 15% ethylene-vinyl acetate copolymer having 9% vinyl acetate and 83.3% linear low density polyethylene with the balance of being a pigment. In addition, suitable heat shrinkable patches can be made with the outer layers comprising a blend of 90% linear low density polyethylene with 10% vinyl acetate copolymer. Based on experience it is believed that the desirable composition range for the outer layer is 80% to 100% linear low density polyethylene and 20% to 0% ethylene-vinyl acetate copolymer with the vinyl acetate content having a range from 7% to 12% vinyl acetate. The inner layers preferably comprise an ethylene vinyl acetate copolymer having 20% to 35% vinyl acetate content.

Typical vacuum bags are made according to the process shown in U.S. Pat. No. 3,741,253 issued on Jun. 26, 1973 to Harri J. Brax et al. The method of the Brax et al patent is well understood in the art and provides background for the description which follows for the method of making the heat shrinkable bone guard patch container of the present invention.

Presently preferred vacuum bags may be made of tubing having four layers comprising, an outer layer (food side) layer of ELVAX 3128 EVA copolymer, a first inner layer of a blend comprising 80% by weight Dowlex 2045 from Dow Chemical, plus 20% by weight of EZ705-009 from Quantum Chemicals, a second inner layer of saran, and a second outer layer of ELVAX 3128 EVA copolymer. Mother preferred vacuum bag film formulation may be made from tubing having an outer layer (food side) comprising a blend of by weight of NA 295-000 from Quantum Chemicals and 10% by weight Dowlex 2045 or comprising 85% by weight of Dowlex 2045 and 15% by weight of Quantum EA719-009, a first inner layer (18) of a blend comprising 80% by weight Dowlex 2045 from Dow Chemical, plus 20% by weight of EZ705-009 from Quantum Chemicals, a second inner layer (20) of saran, and a second outer layer (16) comprising 92.5% by weight of an EVA copolymer LD 318.92 from Exxon plus 7.5% by weight of Dowlex 2045.

To make the heat shrinkable patch of one embodiment of the present invention, a first ethylene-vinyl acetate copolymer having a vinyl-acetate content of approximately 28% by weight is sent to a first extruder. This material forms the inner two layers. Also, a blend having a major proportion of linear low density polyethylene and a minor proportion of a second ethylene-vinyl acetate copolymer, one having a vinyl acetate content in the range of 7% to 12%, is fed into a second extruder. This material forms the outer two layers. Both extruders feed a common coextrusion die of the type which is well-known in the art. The extrudate which issues from the die has an inner wall of the first ethylene-vinyl acetate copolymer and an outer wall of the blend. This type of coextrusion essentially coextrudes two concentric tubes, one inside the other, and in this case the first vinyl acetate copolymer is the inner tube.

As the tube is extruded downwardly it is closed off and flattened by pinch rollers, but in order to keep the first vinyl acetate copolymer from adhering to itself the interior of the tube is coated with an inert dust or powder, preferably powdered cornstarch, in a surface concentration sufficient to prevent self-adherence. This flattened tubing is then fed through an irradiation vault where it will preferably receive a dosage of approximately 7 MR to cross-link the polymeric materials which comprise the tube. The preferred range is 4.5 MR to 13 MR with the most suitable range being between 6 and 8 MR. Chemical cross-linking using an organic peroxide is thought to be an alternate cross-linking method but quite satisfactory results are obtained through use of irradiation and irradiation cross-linking is preferred. After receiving the cross-linking dosage the tube is heated, opened, inflated, and stretched by the well-known bubble technique which is described in the above mentioned Brax et al. patent. The biaxially stretching orients the tube material. After the material has been stretched to the desired diameter and wall thickness, it is then rapidly cooled and collapsed. This process results in a biaxially oriented heat shrinkable patch material which is heat shrinkable at approximately the temperature at which it was oriented. When collapsed and flattened the tubing will now tend to adhere to itself as the stretching decreases the concentration of the corn starch on the inner surface of the bubble or stretched tubing. This concentration of the corn starch now is low enough to permit self-adherence. The vinyl acetate content of the inner wall is approximately 28% by weight. This is an ethylene-vinyl acetate copolymer in the range where the ethylenevinyl acetate copolymer acts as an adhesive. Thus, a multi-layer tubular material is produced, in this instance, a four layer material is produced.

Figure 3:
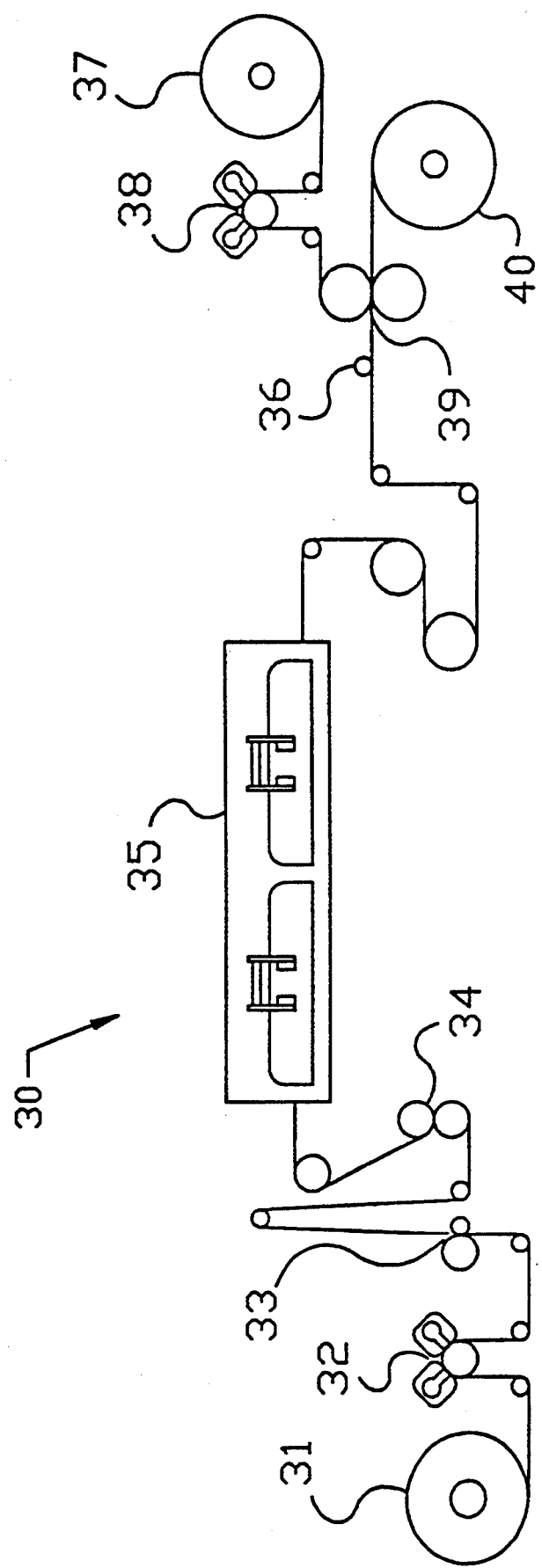
FIG. 3 is a schematic representation of one preferred process of making the trap printed bone-in patches.

This material is then run through a printing operation to place desired graphics in reverse print orientation onto one surface of the material. This can be done using flexographic printing presses and flexographic printing methods well understood in the label printing art. A suitable flexographic printing press is, for example, the Model 5055 Industrial Marking Equipment flexographic printing press. One preferred embodiment for using flexographic printing to produce the reverse printing of the present invention is shown generally as 30 in FIG. 3. FIG. 3 is a schematic representation of one preferred process of making the trap printed Bone-In patchs comprising a patch film unwind means 31, a film treater means 32, a printing means 33, an adhesive coater means 34, dryer 35, a cutting means 36, a tubing web unwind means 37, a tubing web treater means 38, a tubing web to patch film bonding means 39 and a product rewind means 40. In practice the patch film is unwound from unwind means 31 and then passes through corona treating means 32 after which the now treated film is printed on a preferrably flexographic printing means 33, after which the reverse printing 2 (FIG. 2) produced at 33 is coated with adhesive 4 (FIG. 2) at coating means 34. Next the patch film is introduced to a drying means 35 and then cut to size using a cutting means 36. The presently preferred cutting means is a knife cutting means. The reverse printed and sized patch film is then introduced into a bonding means 39 where it is bonded, in a desired position, to a film tubing web fed from tubing web unwind means 37 and corona treating means 38 and then is collected on a rewind means 40.

Inks suitable for use in the present invention include, for example, ink extender RD800, white ink RD501, red ink RD803, purple ink RD810, blue ink RD812 and black ink RD814 available from Flint.

The now reverse printed material can be cut into heat shrinkable patches and adhered to the heat shrinkable tubing which will become the bag used to package the bone-in meat product. Many suitable adhesives to adhere the heat shrinkable reverse printed patch to the bag are available and can readily be selected by those skilled in the art, the tendency to delaminate having been greatly reduced as the heat shrinkable patch shrinks biaxially as does the bag. Examples of suitable types of adhesives include thermoplastic acrylic emulsions, solvent based adhesives and high solids adhesives. The presently preferred adhesive is a thermoplastic acrylic emulsion RhoplexN 619 from Rohm & Haas.

Although the illustrative embodiments of the present invention have been described herein with reference to the accompanying drawings it is to be understood that the invention is not limited to those precise embodiments, and that various other changes and modifications may be effected therein by one skilled in the art without departing from the scope or spirit of the invention.

What is claimed is:

1. A method of making a heat shrinkable bag having a protective heat shrinkable reverse printed bone guard patch attached thereto comprising:
   a) providing an oriented, heat shrinkable, thermoplastic sheet of bone guard patch film;
   b) reverse printing at least one desired graphic on one surface of said bone guard patch film;
   c) applying an adhesive composition over the reverse printed surface of said bone guard patch film and over the reverse printing;
   d) adhesively bonding the reverse printed and adhesive layered bone guard patch film onto an oriented, heat shrinkable, thermoplastic tubing in a desired position;
   e) forming a bag from the heat shrinkable bone guard patch adhering thermoplastic tubing; and
   f) thereby producing an oriented, heat shrinkable, thermoplastic bag having a heat shrinkable bone guard patch in a desired position thereon, such that the reverse printing is disposed between the surface of the bone guard patch film and the adhesive composition.

2. A method as claimed in claim 1 wherein, said oriented, heat shrinkable, thermoplastic tubing, and said heat shrinkable bone guard patch are both biaxially oriented.

3. A method as claimed in claim 1 wherein, one heat shrinkable bone guard patch is bonded to the heat shrinkable thermoplastic tubing.

4. A method as claimed in claim 1 wherein, two or more heat shrinkable bone guard patches are bonded to the heat shrinkable thermoplastic tubing.

5. A method as claimed in claim 1 wherein, said produced bags are side seal bags.

6. A method as claimed in claim 1 wherein, said produced bags are end seal bags.

7. A method as claimed in claim 1 wherein, said graphic is printed using a non-adhesive ink.

8. A method as claimed in claim 1 wherein, said graphic is printed using an adhesive ink.

9. A method as claimed in claim 1 wherein, said bone guard patch film comprises a single layer film or oriented heat shrinkable thermoplastic film.

10. A method as claimed in claim 1 wherein, said bone guard patch film comprises a multiple layer film of oriented heat shrinkable thermoplastic film.

11. A method as claimed in claim 1 wherein, said bone guard patch film comprises a four layer film of oriented heat shrinkable thermoplastic film.

12. A method as claimed in claim 11 wherein, said bone guard patch film comprises two outer layers comprising linear low density polyethylene and two inner layers comprising ethylene-vinyl acetate copolymer.

13. A method as claimed in claim 12 wherein, said two outer layers comprise a major amount by weight of linear low density polyethylene and a minor amount by weight of an ethylene-vinyl acetate having a vinyl acetate content in the range from about 7% to about 12% by weight, and form about 0% to about 5% by weight pigments and additives; and said inner two layers comprise an ethylene-vinyl acetate copolymer having from about 20% to about 35% by weight vinyl acetate content.

14. A method as claimed in claim 1 wherein, said bone guard patch film is transparent.

15. A method as claimed in claim 1 wherein, said bone guard patch film is translucent.

* * * * *